United States Patent
Gomi et al.

(10) Patent No.: US 7,513,530 B2
(45) Date of Patent: Apr. 7, 2009

(54) SEATBELT APPARATUS

(75) Inventors: Seiji Gomi, Tokyo (JP); Byoung Hoon Lee, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/481,185

(22) Filed: Jul. 6, 2006

(65) Prior Publication Data

US 2007/0013184 A1 Jan. 18, 2007

(30) Foreign Application Priority Data

Jul. 14, 2005 (JP) .............................. 2005-205078

(51) Int. Cl.
*B60R 22/00* (2006.01)

(52) U.S. Cl. .................. 280/801.1; 24/163 R; 180/268; 277/634; 277/636; 297/468; 297/482

(58) Field of Classification Search ................. 297/482, 297/468; 280/808, 801.1, 801.2, 806; 24/163 R, 24/579.1; 180/268, 269, 270; 277/634, 636
See application file for complete search history.

(56) References Cited

U.S. PATENT DOCUMENTS

| 3,381,268 | A | * | 4/1968 | Boblitz | 180/270 |
|---|---|---|---|---|---|
| 3,833,781 | A | * | 9/1974 | Rumpf | 200/61.58 B |
| 4,194,786 | A | | 3/1980 | Gilmore | |
| 4,199,190 | A | * | 4/1980 | Lindblad | 280/801.1 |
| 5,181,773 | A | * | 1/1993 | Colvin | 362/488 |
| 6,471,690 | B1 | | 10/2002 | Ouchi | |
| 6,679,524 | B2 | * | 1/2004 | Greib et al. | 280/801.1 |
| 6,808,207 | B2 | | 10/2004 | Nakano et al. | |
| 2002/0180200 | A1 | * | 12/2002 | Tokugawa | 280/801.1 |

FOREIGN PATENT DOCUMENTS

| FR | 2 526 381 | 11/1983 |
|---|---|---|
| JP | 61-203358 | 12/1986 |
| JP | 63-98507 | 6/1988 |
| JP | 2002-64915 | 2/2002 |
| JP | 2003-322773 | 11/2003 |

OTHER PUBLICATIONS

"Tension sensing assembly", Research Disclosure, vol. 474, No. 49, Oct. 2003. 2 pgs.

* cited by examiner

*Primary Examiner*—Eric Culbreth
(74) *Attorney, Agent, or Firm*—Foley & Lardner LLP

(57) ABSTRACT

A seatbelt assembly is provided with buckle device having a holder located therein to segregate overlapping sections of the structural wire and/or signal cables.

19 Claims, 6 Drawing Sheets

PRIOR ART

SEATBELT APPARATUS

BACKGROUND

The present invention relates generally to the field of vehicle seatbelts.

Seatbelts are installed in vehicles to increase passenger safety. A tongue, which is provided at an end of a seatbelt webbing, is fixed to engage with a buckle device on the floor of the vehicle. When the seatbelt is buckled the passenger is constrained by the seatbelt.

As disclosed for example in Japanese Patent Publication No. 2002-321593 (incorporated by reference herein) a seatbelt apparatus may include a wire strap. The wire-strap type buckle includes a buckle section with an opening at one end for inserting the tongue therein. The buckle section includes latch members that engage the inserted tongue; the buckle section is supported on both sides by a U-shaped frame so as to enable rotation of the buckle. The latch members are provided with two switches, one on a "hall" side and another on a "substrate" side for detecting engagement between the tongue and buckle.

Within the enclosure of the buckle, both ends of a wire are bent into two parts so as to form a loop (with overlapping portions) rotatably mounted to the vehicle floor. The looped portion of the wire is rotatably supported by a fixed member on the vehicle floor so that the enclosure is supported on the floor of the vehicle body and may swing freely therefrom. A protective cover (or boot) of an accordion shape is mounted between the enclosure and the fixed member for storing the wire and/or signal cables connected to the switches.

When a passenger engages the tongue of the seatbelt to the buckle device, an upper end of the buckle device is pulled in the longitudinal (or fore/aft direction) by a tensile force applied to the seatbelt. Therefore, the protective cover and the wire in the protective cover are bent in the longitudinal direction with respect to the vehicle. At this time, as shown in FIG. 6a-6b, for example, a portion of the protective cover 18 is significantly bent at an acute angle causing a concentrated bending stress in that area. The wire 14 may be significantly bent or crossed at a portion near the corresponding area(s) of the protective cover 18.

Accordingly, it is desirable to provide a seatbelt apparatus that can prevent the wire from being bent excessively or portions of the wire from intertwining when the seatbelt is buckled.

SUMMARY

In one exemplary embodiment a seatbelt apparatus includes a seatbelt having a tongue and a buckle configured to engage with the tongue. The buckle may include a switch configured for sensing engagement between the buckle section and the tongue. A wire is configured for fixing the buckle device to a vehicle body side. A protective cover, covers an outer side of the wire so as to house the wire. A signal cable may be connected to the switch and extends on an inner side of the protective cover. A holder may be located on the inner side of the protective cover and fitted on the outer side of the wire.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
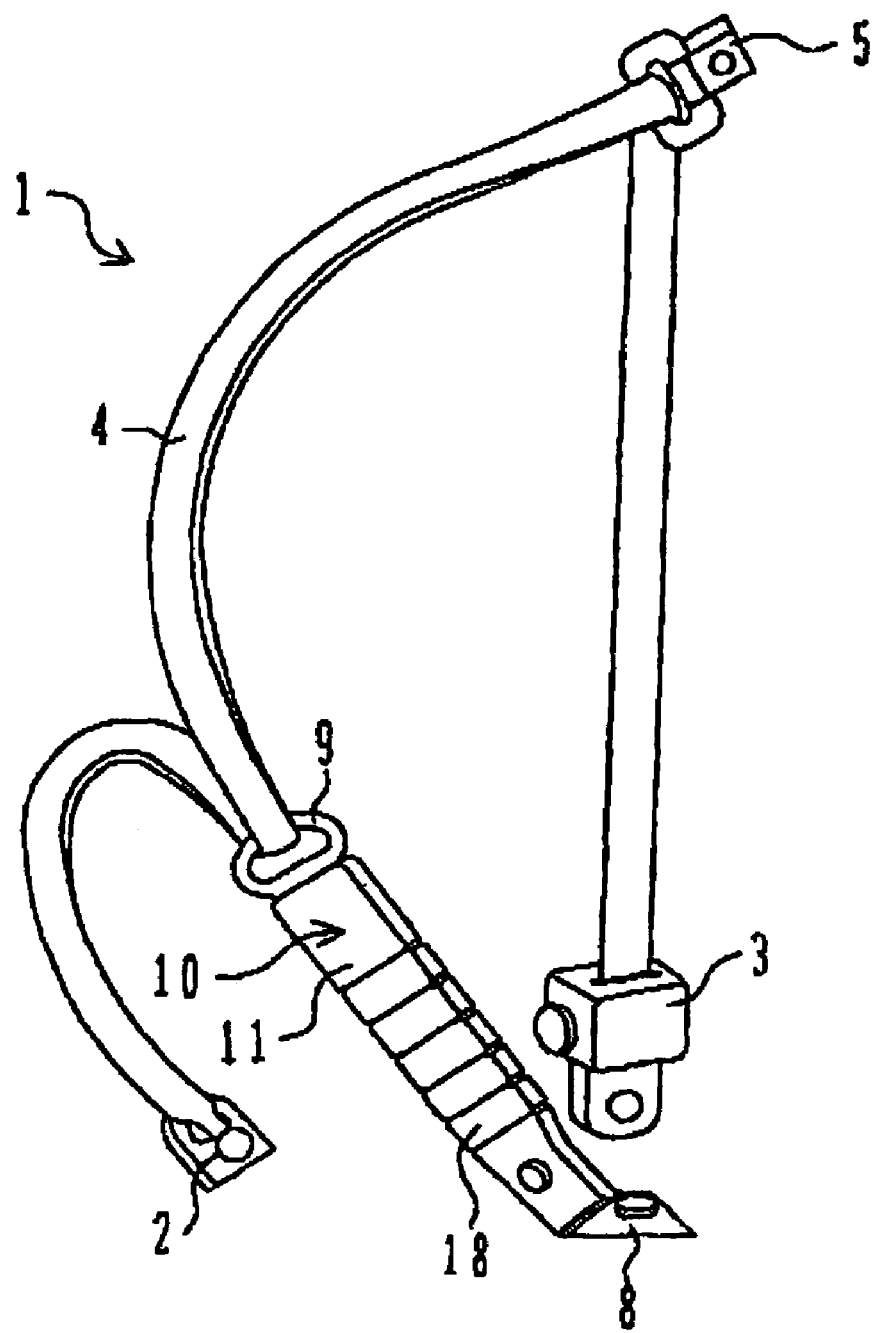
FIG. 1 is a schematic depiction of a seatbelt apparatus according to an exemplary embodiment.
Figure 2:
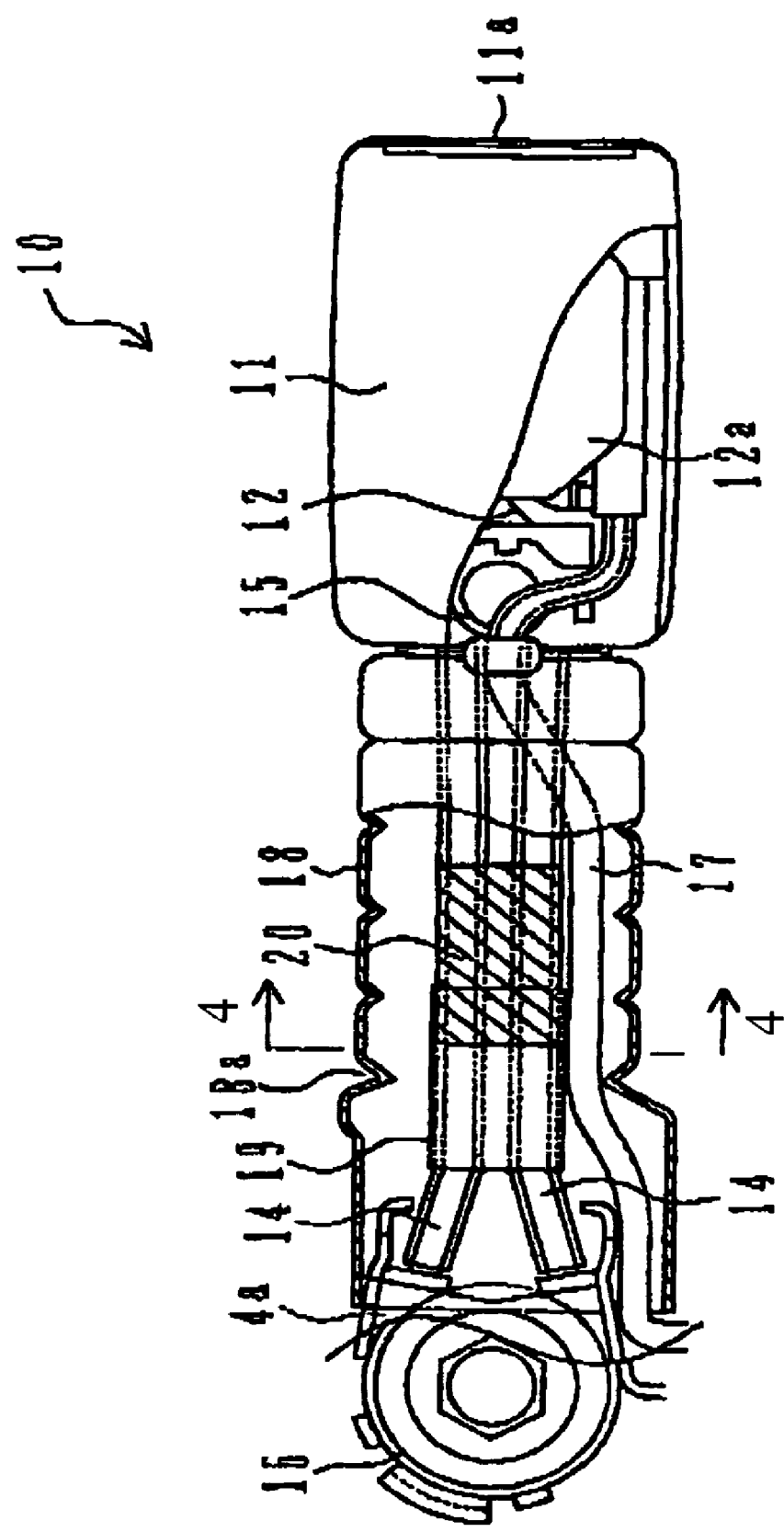
FIG. 2 is a schematic depiction of a buckle device according to an exemplary embodiment.
Figure 3:
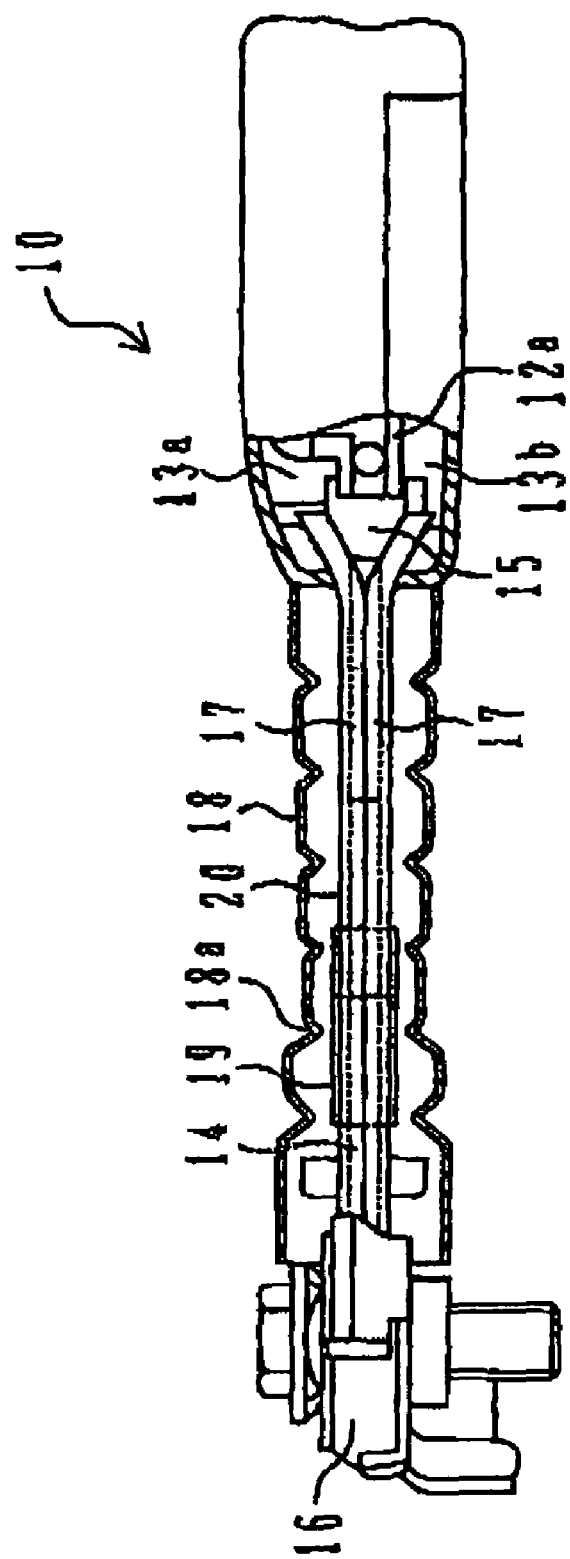
FIG. 3 is a schematic depiction of a side cross-sectional view of the buckle device of FIG. 2.
Figure 4:
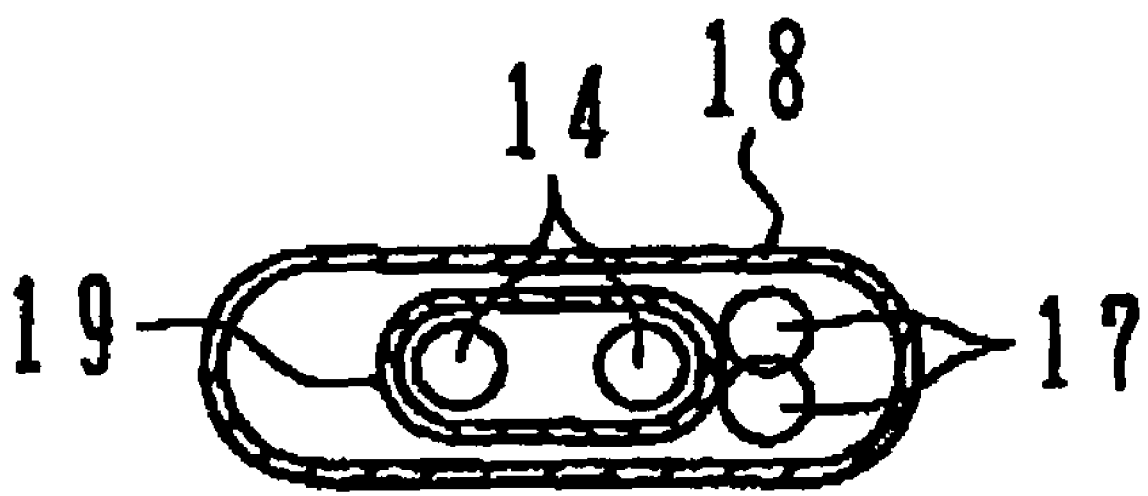
FIG. 4 is a cross-sectional view taken along the line 4-4 in FIG. 2.

The seatbelt assembly 1 includes a seatbelt 4 with tongue 9, a buckle device 10 having a buckle section 12 configured to engage with the tongue 9 and a set of switches 13a, 13b for sensing engagement between the buckle section and the tongue. Also provided is a wire 14 for fixing the buckle device 10 to the vehicle body frame. A protective cover 18 on an outer peripheral side of the wire encloses (or stores) the wire 14. A signal cable 17 is connected to the switches 13a, 13b and extends on the inner peripheral side of the protective cover 18. A holder 19 is located on the inner peripheral side of the protective cover 18 and fitted on the outer periphery of the wire 14.

An upper end of the buckle device 10 is pulled in the longitudinal (or fore-and-aft) direction with respect to the vehicle. The protective cover 18 and the wire 14 encased in the protective cover are bent in the longitudinal direction when the seatbelt 4 is worn or buckled. The holder 19 is fitted on the outer periphery of the wire 14 on the inner peripheral of the protective cover 18. The protective cover 18 and wire 14 are restricted from bending at a sharp acute angle. Therefore, the stress concentration factor within the wire 14 can be significantly reduced by the inclusion of the holder 19 in the seatbelt assembly 1. Excessive bending of the wire or crossing of the parts of the wire can be prevented by inclusion of the holder 19.

The protective cover 18 is configured to rotate (or swing freely) with respect to the vehicle floor. The wire 14 is fixed at each end of the enclosure 11 of the buckle device 10. In one exemplary embodiment, the wire 14 includes a bent end pivotably coupled to or supported by a fixed member 8 (or anchor) coupled to the vehicle frame or the vehicle seat. The protective cover 18 is formed into an accordion shaped member (or boot) which supports the enclosure 11 and enables the buckle device 10 to rotate. The holder is located within the cover or enclosure and covers the wire to thereby provide additional rigidity to the wire when the enclosure is subject to a bending moment in a plane extending in the longitudinal direction of the vehicle.

The upper end of the buckle device 10 is rotatable in the longitudinal direction with respect to the vehicle. The holder 19 resists the bending moment resulting from the buckle device 10 rotating with respect to the vehicle floor and thereby reduces the stress concentration factor in the wire 14. In one exemplary embodiment, the holder 19 is fitted on the wire 14 at a portion of the protective cover 18 proximate a constricted portion of the protective cover 18 located on the fixed member 8 side. Bending of the wire 14 at the constricted portion on the fixed member 8 side can reliably be alleviated with the implementation of the holder 19. Hence excessive bending of the wire 14 can reliably be prevented. In one exemplary embodiment, an adhesive tape 20 is wound around the holder 19 and the wire 14 so as to fix the holder 19 to the wire 14.

Referring now to the figures, particularly to FIG. 1, the seatbelt assembly 1 for use with a driver or passenger seat in a motor vehicle in shown. The seatbelt apparatus 1 includes a seatbelt (webbing) 4 which is supported at one end by an anchor 2 fixed to the vehicle floor. A retracting device 3 is coupled to the seatbelt at the other end and fixed to the vehicle floor. The retracting device applies pressure to the seatbelt which is configured to be retracted while constraining the occupant. A midsection of the seatbelt 4 is passed through a shoulder anchor 5 rotatably held at a position on a center pillar (not shown) of the vehicle body. In the illustrated exemplary embodiment, the center pillar is attached to an upper side of the vehicle body. The tongue 9 is attached to the seatbelt 4 below the shoulder anchor 5. The buckle device 10 is connected to a fixed side member 8 provided on a side of a seat (not shown) opposite the anchor 2. The seatbelt assembly 1 is fixed to the vehicle floor. The fixed side member 8 may be provided on a floor side of the vehicle body.

In one exemplary embodiment, the buckle device 10 includes a buckle section 12 having a flat enclosure 11 opened at one end for inserting the tongue 9 (as shown in FIG. 2 to FIG. 5). The buckle section 12 includes latch members configured to engage the tongue 9 when inserted into the enclosure 11 from an opening 11a at one end. The latch members are supported on both sides of a base 12a in a U-shaped frame to enable rotation. The latch members are provided with two switches 13a, 13b on a hall side and a substrate side for detecting engagement with the tongue.

The wire 14 is folded into at least two parts so as to form a loop pivotably secured at each end in the enclosure 11 via a wheel 16. The wire 14 is pivotably supported by the fixed member 8 on the side of the seat via a wheel 16. A looped portion 14a on the bent end of the wire 14 is wound around the wheel 16. The protective cover 18 is mounted between the enclosure 11 and the fixed member 8 for storing the wire 14 and signal cables 17 connected to the switches 13a, 13b. When the occupant buckles the seatbelt 4, the upper end of the buckle device 10 is pulled in the longitudinal direction by the seatbelt. The protective cover 18 and the wire 14 are bent in the longitudinal direction of the vehicle.

In one exemplary embodiment, the holder 19 is a resilient member composed of aluminum or resin. In another exemplary embodiment, the holder 19 is fitted on the wire 14 in the vicinity of the constricted portion 18a of a lower section of the protective cover 18. An adhesive tape 20 is wound around the holder 19 so as to ride across the wire 14, so that the holder 19 is fixed to the wire 14. Accordingly, the holder 19 and the wire 14 can be fixed reliably in a simple method.

Figure 5:
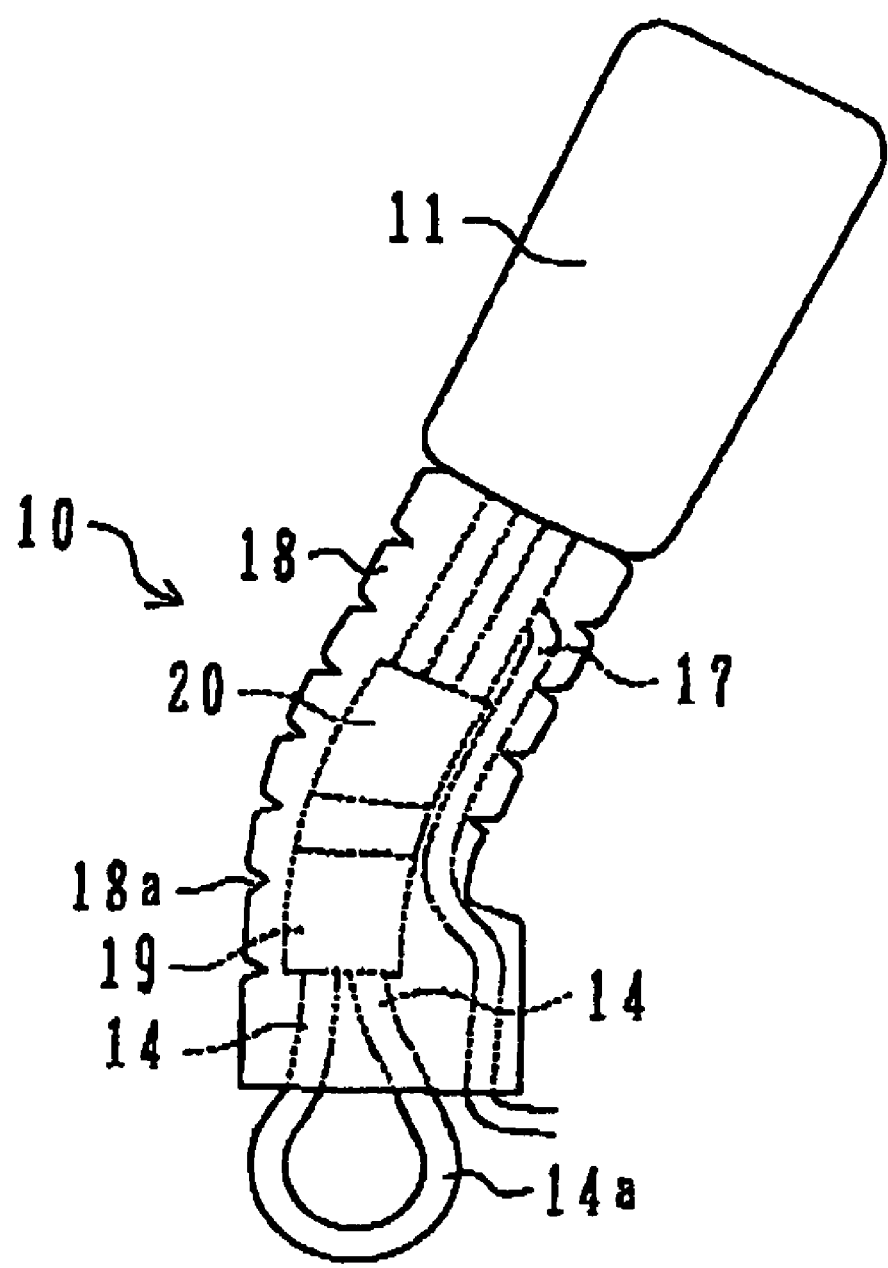
FIG. 5 is a schematic depiction of a buckle device according to an exemplary embodiment.
Figure 6:
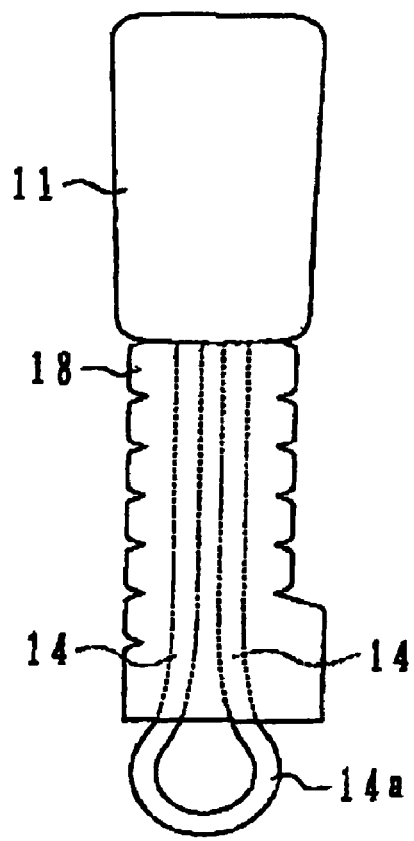
FIG. 6a is a schematic depiction of a prior art buckle device in a design position.
FIG. 6b is a schematic depiction of a prior art buckle device in a use position.
Figure 6:
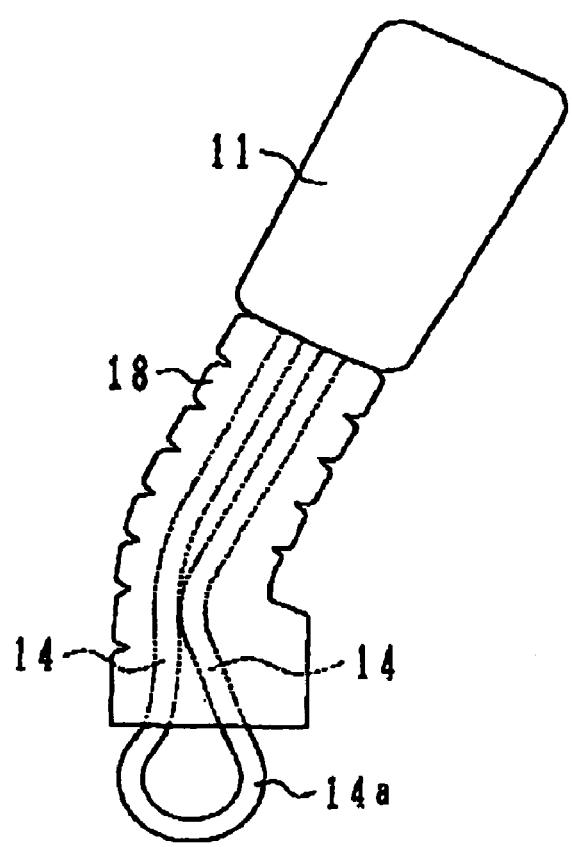

The holder 19 provides support to the wire 14, as shown in FIG. 5. The holder 19 prevents the protective cover 18 and the wire 14 from being significantly bent at an acute angle in the vicinity of the protective cover 18. Bending stresses are less concentrated and the wire 14 is prevented from being excessively bent or crossed with each other.

The priority application, Japanese Patent Application No. 2005-205078, filed on Jul. 14, 2005, is hereby incorporated by reference herein in its entirety.

Given the disclosure of the present invention, one versed in the art would appreciate that there may be other embodiments and modifications within the scope and spirit of the invention. For example, the teachings herein can be applied to any seatbelt assembly and are not limited to a three-point seatbelt assembly.

What is claimed is:

1. A seatbelt apparatus comprising:
   a seatbelt having a tongue;
   a buckle device having a buckle section configured to engage with the tongue, the buckle device further having a switch configured to sense engagement between the buckle section and the tongue, wherein the buckle section includes an enclosure;
   a wire configured to fix the buckle device to a vehicle body;
   a protective cover, covering an outer side of the wire so as to house the wire;
   a signal cable connected to the switch and extending on an inner side of the protective cover;
   a holder located on the inner side of the protective cover and fitted on the outer side of the wire; and
   a wheel configured to connect the seatbelt apparatus to a vehicle frame or a vehicle seat;
   wherein ends of the wire are mounted in the enclosure of the buckle section;
   wherein the wire is folded about the wheel so that the wire is pivotably secured via the wheel.

2. The seatbelt of claim 1, wherein the wire has a first portion and a second portion;
   wherein the first portion includes the ends of the wire and is covered by the enclosure;
   wherein the second portion of the wire is configured to bend, wherein the wire is pivotally supported by the wheel and a fixed member; and
   wherein the protective cover is accordion shaped and is configured to support the enclosure on the frame or a side of the seat, and is configured to rotate with respect to the seat.

3. The seatbelt of claim 2, wherein the holder is fitted on the wire at a constricted portion of the protective cover adjacent the fixed member.

4. The seatbelt of claim 1, further comprising:
   a tape wound around the holder and wire so as to at least partially cover the holder and the wire, thereby affixing the holder to the wire.

5. The seatbelt of claim 1, wherein the holder is located at a fixed position relative to the wire.

6. The seatbelt of claim 1, wherein the holder is located proximate to a constricted portion of the protective cover.

7. The seatbelt assembly of claim 1, wherein the wire and the wheel are supported by a fixed member that is configured to be coupled to a vehicle frame or a vehicle seat, wherein the holder is located adjacent to the fixed member.

8. The seatbelt assembly of claim 1, wherein the wire comprises a looped portion that is wrapped around the wheel.

9. The seatbelt assembly of claim 1, wherein the protective cover includes a constricted portion.

10. A seatbelt assembly for use in a motor vehicle, comprising:
    a seatbelt;
    a tongue slidably attached to the seatbelt; and
    a buckle configured to engage the tongue;

a wire configured to connect the buckle to the vehicle;

an enclosure covering the buckle and ends of the wire mounted in the enclosure;

a holder located within the enclosure and covering the wire to thereby provide additional rigidity to the wire when the enclosure is subject to a bending moment in a plane extending in the longitudinal direction of the vehicle; and a wheel configured to connect the seatbelt assembly to a vehicle frame or a vehicle seat, wherein the wire is folded about the wheel so that the wire is pivotably secured via the wheel.

11. The assembly of claim 10, wherein the wire comprises a plurality of overlapping portions.

12. The assembly of claim 10, further comprising a buckle switch and a signal wire carrying a signal from the buckle switch to a controller, wherein the signal wire is contained within the enclosure.

13. The seatbelt assembly of claim 10, wherein the enclosure is configured to rotate with respect to the fixed member.

14. The seatbelt assembly of claim 10, wherein the wire comprises a looped portion that is wrapped around the wheel.

15. The seatbelt assembly of claim 10, further comprising tape configured to secure the wire to the holder.

16. The seatbelt assembly of claim 10, wherein the holder is located at a fixed position relative to the wire.

17. The seatbelt assembly of claim 10, wherein the holder is located proximate to a constricted portion of the enclosure.

18. The seatbelt assembly of claim 10, wherein the wire is supported by a fixed member that is configured to be coupled to a vehicle frame or a vehicle seat, wherein the holder is located adjacent to the fixed member.

19. The seatbelt assembly of claim 10, wherein the protective cover includes a constricted portion.

* * * * *